United States Patent
Cowan et al.

(10) Patent No.: US 9,948,998 B1
(45) Date of Patent: Apr. 17, 2018

(54) PROVIDING CONTENT RELATED TO A SELECTED CHANNEL FOR PRESENTATION TO A USER VIA A CLIENT DEVICE

(71) Applicant: GOOGLE INC., Mountain View, CA (US)

(72) Inventors: Mathew Cowan, New York, NY (US); Christopher Pedregal, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 1 day.

(21) Appl. No.: 15/362,459

(22) Filed: Nov. 28, 2016

Related U.S. Application Data

(63) Continuation of application No. 13/929,449, filed on Jun. 27, 2013, now abandoned.

(60) Provisional application No. 61/721,407, filed on Nov. 1, 2012.

(51) Int. Cl.
| | | |
|---|---|---|
| H04N 5/445 | (2011.01) | |
| H04N 21/8545 | (2011.01) | |
| H04N 21/482 | (2011.01) | |
| H04N 21/44 | (2011.01) | |
| H04N 21/45 | (2011.01) | |
| H04N 21/442 | (2011.01) | |
| H04N 21/4722 | (2011.01) | |

(52) U.S. Cl.
CPC ......... *H04N 21/8545* (2013.01); *H04N 21/44* (2013.01); *H04N 21/44209* (2013.01); *H04N 21/4532* (2013.01); *H04N 21/482* (2013.01); *H04N 21/4722* (2013.01)

(58) Field of Classification Search
CPC .................................................. H04N 21/4722
USPC ..................................................... 725/45–47
See application file for complete search history.

(56) References Cited

U.S. PATENT DOCUMENTS

| | | |
|---|---|---|
| 8,095,439 B1 | 1/2012 | Harman et al. |
| 8,751,292 B2 | 6/2014 | Del Favero et al. |
| 2002/0004735 A1 | 1/2002 | Gross |
| 2002/0160817 A1 | 10/2002 | Salmimaa et al. |
| 2007/0094066 A1 | 4/2007 | Kumar et al. |
| 2007/0118498 A1 | 5/2007 | Song et al. |
| 2009/0132347 A1* | 5/2009 | Anderson ............... G06Q 30/02 705/14.52 |
| 2010/0049538 A1* | 2/2010 | Frazer ................... G06Q 30/02 705/14.4 |
| 2011/0047573 A1* | 2/2011 | Onogi ................ H04N 5/44543 725/41 |
| 2012/0023131 A1* | 1/2012 | Downey ........... G06F 17/30038 707/769 |
| 2014/0052564 A1* | 2/2014 | Lewis ................ G06Q 30/0621 705/26.5 |

(Continued)

*Primary Examiner* — Pankaj Kumar
*Assistant Examiner* — Sahar Baig
(74) *Attorney, Agent, or Firm* — Middleton Reutlinger

(57) ABSTRACT

A system may receive an entity identifier for a user. The entity identifier may identify an entity that is associated with a category. The system may identify channel(s) for the category by obtaining data for the user, and analyzing the data to determine a score for each channel. The system may use the scores to select one or more of the channels. The system may provide content related to the selected channel (s) to a client device of the user, and the user may interact with the content via the client device.

16 Claims, 8 Drawing Sheets

(56) References Cited

U.S. PATENT DOCUMENTS

2014/0052615 A1    2/2014   Andersen

\* cited by examiner

US 9,948,998 B1

PROVIDING CONTENT RELATED TO A SELECTED CHANNEL FOR PRESENTATION TO A USER VIA A CLIENT DEVICE

BACKGROUND

This specification relates to providing notifications.

User devices, e.g., cell phones, tablets, personal assistant devices, computers, etc., provide users with information. Users can request specific information that is of interest to the users. For example, user devices can provide users with contact information, upcoming calendar events, traffic information, weather information, as well as any Internet accessible information requested by the user. User devices also provide notifications to users. For example, when a cell phone receives a call, the cell phone may provide a visual notification, e.g., a screen may display call information, an audible notification, e.g., a speaker may generate a ring tone, and/or a sensory notification, e.g., a motor causing vibrations. The user experience of a user device can depend on its ability to provide helpful notifications to the user.

SUMMARY

This specification describes technology relating to providing preferred distribution channels.

According to some possible implementations, a computer-implemented method may include receiving an entity identifier for a user, where the entity identifier may identify an entity, and where the entity may be associated with a category of goods; identifying one or more distribution channels for the category of goods, where identifying the one or more distribution channels may include obtaining data for the user, where the data may identify instances in which the user obtained goods in the category of goods, analyzing the data to determine a score for each of a set of distribution channels, where the score, for a particular distribution channel of the set of distribution channels, may be determined based on a number of instances in which the user obtained goods in the category of goods from the particular distribution channel, and identifying the one or more distribution channels, for the category of goods, from the set of distribution channels based on the scores for the set of distribution channels; and providing information regarding the one or more distribution channels, where one or more goods, associated with the entity, may be available via the one or more distribution channels.

According to some possible implementations, the method may further include providing information regarding the set of distribution channels to the user; receiving a selection of one or more of the set of distribution channels from the user; and identifying the one or more distribution channels from the selected one or more of the set of distribution channels.

According to some possible implementations, analyzing the data further may include determining the score for the particular distribution channel, of the set of distribution channels, based on the number of instances in which the user obtained goods in the category of goods from the particular distribution channel within a time period.

According to some possible implementations, providing the information regarding the one or more distribution channels may include presenting the information regarding the one or more distribution channels in an order, where the order may be based on the scores determined for the one or more distribution channels.

According to some possible implementations, providing the information regarding the one or more distribution channels may include providing the entity identifier and the information regarding the one or more distribution channels for display on a client device associated with the user.

According to some possible implementations, providing the information regarding the one or more distribution channels may include providing a link for each respective distribution channel of the one or more distribution channels, where the link may reference the respective distribution channel of the one or more distribution channels.

According to some possible implementations, the method may further include receiving an interaction with the link at a client device associated with the user; and causing the client device to execute an application associated with the respective distribution channel, where the one or more goods, associated with the entity, may be available via the application.

According to some possible implementations, a system may include one or more computers to: receive an entity identifier for a user, where the entity identifier may identify an entity, and where the entity may be associated with a category of goods; identify one or more distribution channels for the category of goods, where the one or more computers, when identifying the one or more distribution channels, are to obtain data for the user, where the data may identify instances in which the user obtained goods in the category of goods, analyze the data to determine a score for each of a set of distribution channels, where the score, for a particular distribution channel of the set of distribution channels, may be determined based on a number of instances in which the user obtained goods in the category of goods from the particular distribution channel, and identify the one or more distribution channels, for the category of goods, from the set of distribution channels based on the scores for the set of distribution channels; and provide information regarding the one or more distribution channels, where one or more goods, associated with the entity, may be available via the one or more distribution channels.

According to some possible implementations, the one or more computers may provide information regarding the set of distribution channels to the user; receive a selection of one or more of the set of distribution channels from the user; and identify the one or more distribution channels from the selected one or more of the set of distribution channels.

According to some possible implementations, the one or more computers, when analyzing the data, may determine the score for the particular distribution channel, of the set of distribution channels, based on the number of instances in which the user obtained goods in the category of goods from the particular distribution channel within a time period.

According to some possible implementations, the one or more computers, when providing the information regarding the one or more distribution channels, may present the information regarding the one or more distribution channels in an order, where the order may be based on the scores determined for the one or more distribution channels.

According to some possible implementations, the one or more computers, when providing the information regarding the one or more distribution channels, may provide the entity identifier and the information regarding the one or more distribution channels for display on a client device associated with the user.

According to some possible implementations, the one or more computers, when providing the information regarding the one or more distribution channels, may provide a link for each respective distribution channel of the one or more distribution channels, where the link may reference the respective distribution channel of the or more distribution channels.

According to some possible implementations, the one or more computers may further receive an interaction with the link at a client device associated with the user; and cause the client device to execute an application associated with the respective distribution channel, where the one or more goods, associated with the entity, may be available via the application.

According to some possible implementations, a computer storage medium may store instructions, where the instructions may include a set of instructions which, when executed by one or more processors, cause the one or more processors to: receive an entity identifier for a user, where the entity identifier may identify an entity, and where the entity may be associated with a category of goods; identify one or more distribution channels for the category of goods, where one or more instructions, of the set of instructions, which cause the one or more processors to identify the one or more distribution channels further cause the one or more processors to obtain data for the user, where the data may identify instances in which the user obtained goods in the category of goods, analyze the data to determine a score for each of a set of distribution channels, where the score, for a particular distribution channel of the set of distribution channels, may be determined based on a number of instances in which the user obtained goods in the category of goods from the particular distribution channel, and identify the one or more distribution channels, for the category of goods, from the set of distribution channels based on the scores for the set of distribution channels; and provide information regarding the one or more distribution channels, where one or more goods, associated with the entity, may be available via the one or more distribution channels.

According to some possible implementations, the set of instructions, which when executed by the one or more processors, may further cause the one or more processors to: provide information regarding the set of distribution channels to the user; receive a selection of one or more of the set of distribution channels from the user; and identify the one or more distribution channels from the selected one or more of the set of distribution channels.

According to some possible implementations, the set of instructions, which cause the one or more processors to analyze the data, may further cause the one or more processors to determine the score for the particular distribution channel based on the number of instances in which the user obtained goods in the category of goods from the particular distribution channel within a time period.

According to some possible implementations, one or more instructions, of the set of instructions, which cause the one or more processors to provide the information regarding the one or more distribution channels, may further cause the one or more processors to present the information regarding the one or more distribution channels in an order, where the order may be based on the scores determined for the one or more distribution channels.

According to some possible implementations, one or more instructions, of the set of instructions, which cause the one or more processors to provide the information regarding the one or more distribution channels, may further cause the one or more processors to provide the entity identifier and the information regarding the one or more distribution channels for display on a client device associated with the user.

According to some possible implementations, one or more instructions, of the set of instructions, which cause the one or more processors to provide the information regarding the one or more distribution channels, may further cause the one or more processors to provide a link for each respective distribution channel of the one or more distribution channels, where the link may reference the respective distribution channel of the one or more distribution channels, where the set of instructions, when executed by the one or more processors, further cause the one or more processors to: receive an interaction with the link at a client device associated with the user; and cause the client device to run an application associated with the respective distribution channel, where the one or more goods, associated with the entity, may be available via the application.

According to some possible implementations, a system may include means for receiving an entity identifier for a user, where the entity identifier may identify an entity, and where the entity may be associated with a category of goods; means for identifying one or more distribution channels for the category of goods, where the means for identifying the one or more distribution channels may include means for obtaining data for the user, where the data may identify instances in which the user obtained goods in the category of goods, means for analyzing the data to determine a score for each of a set of distribution channels, where the score, for a particular distribution channel of the set of distribution channels, may be determined based on a number of instances in which the user obtained goods in the category of goods from the particular distribution channel, and means for identifying the one or more distribution channels, for the category of goods, from the set of distribution channels based on the scores for the set of distribution channels; and means for providing information regarding the one or more distribution channels, where one or more goods, associated with the entity, may be available via the one or more distribution channels.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

Like reference numbers and designations in the various drawings indicate like elements.

DETAILED DESCRIPTION

The subject matter described in this specification can be implemented in particular embodiments so as to realize one or more of the following advantages. Preferred distribution channels for different categories of goods can be determined for users. Users can be provided with notifications for entities of interest and preferred distribution channels for the entities. Users can use the preferred distribution channels to source the entities of interest.

In some implementations, data may be organized in a database using any one or more data structuring techniques. For example, data may be organized in a graph containing nodes connected by edges. In some implementations, the data may include statements about relationships between things and concepts, and those statements may be represented as nodes and edges of a graph. The nodes each contain a piece or pieces of data and the edges represent relationships between the data contained in the nodes that the edges connect. In some implementations, the graph includes one or more pairs of nodes connected by an edge. The edge, and thus the graph, may be directed, i.e. unidirectional, undirected, i.e. bidirectional, or both, i.e. one or more edges may be undirected and one or more edges may be directional in the same graph. Nodes may include any suitable data or data representation. Edges may describe any suitable relationships between the data. In some implementations, an edge is labeled or annotated, such that the edge includes both the connection between the nodes, and descriptive information about that connection. A particular node may be connected by distinct edges to one or more other nodes, or to itself, such that an extended graph is formed. For purposes of clarity, a graph based on the structure described immediately above is referred to herein as a knowledge graph. In some implementations, the knowledge graph may be a useful for representing information and in providing information in search.

Figure 1:
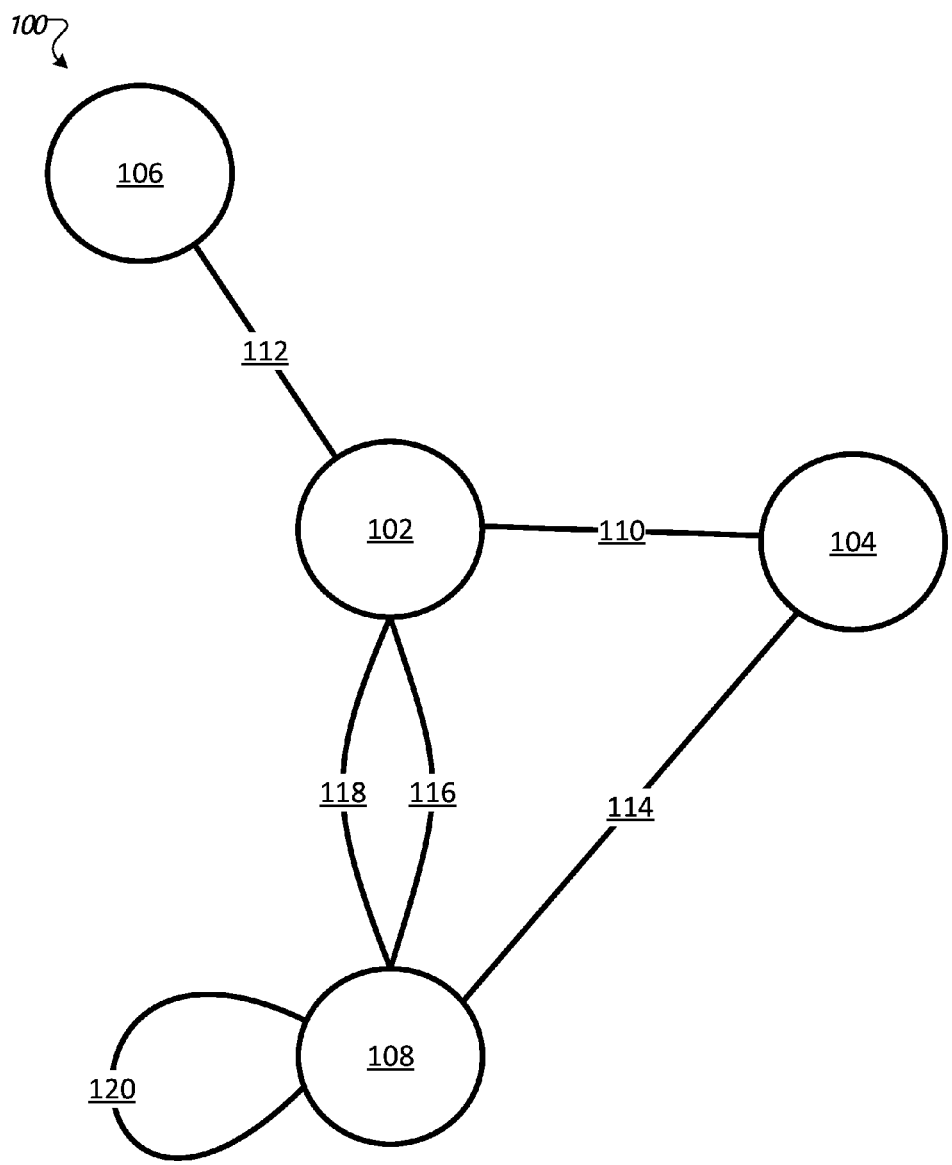
FIG. 1 illustrates an example knowledge graph containing nodes and edges.

FIG. 1 illustrates an example knowledge graph 100 containing nodes and edges. Illustrative knowledge graph 100 includes nodes 102, 104, 106, and 108. Knowledge graph 100 includes edge 110 connecting node 102 and node 104. Knowledge graph 100 includes edge 112 connecting node 102 and node 106. Knowledge graph 100 includes edge 114 connecting node 104 and node 108. Knowledge graph 100 includes edge 116 and edge 118 connecting node 102 and node 108. Knowledge graph 100 includes edge 120 connecting node 108 to itself. Each aforementioned group of an edge and one or two distinct nodes may be referred to as a triple or 3-tuple. As illustrated, node 102 is directly connected by edges to three other nodes, while nodes 104 and 108 are directly connected by edges to two other nodes. Node 106 is connected by an edge to only one other node, and in some implementations, node 106 is referred to as a terminal node. As illustrated, nodes 102 and 108 are connected by two edges, indicating that the relationship between the nodes is defined by more than one property. As illustrated, node 108 is connected by edge 120 to itself, indicating that a node may relate to itself. While illustrative knowledge graph 100 contains edges that are not labeled as directional, it will be understood that each edge may be unidirectional or bidirectional. It will be understood that this example of a graph is merely an example and that any suitable size or arrangement of nodes and edges may be employed.

Generally, nodes in a knowledge graph can be grouped into several categories. Nodes may represent entities, organizational data such as entity types and properties, literal values, and models of relationships between other nodes.

In some implementations, entity types, properties, and other suitable content is created, defined, redefined, altered, or otherwise generated by any suitable technique. For example, content may be generated by manual user input, by automatic responses to user interactions, by importation of data from external sources, by any other suitable technique, or any combination thereof. For example, if a commonly searched for term is not represented in the knowledge graph, one or more nodes representing that node may be added. In another example, a user may manually add information and organizational structures.

A node of a knowledge graph may represent an entity. An entity is a thing or concept that is singular, unique, well-defined and distinguishable. For example, an entity may be a person, place, item, idea, abstract concept, concrete element, other suitable thing, or any combination thereof. Nodes are unique, in that no two nodes refer to the same thing or concept. Generally, entities include things or concepts represented linguistically by nouns. For example, the color "Blue," the city "San Francisco," and the imaginary animal "Unicorn" may each be entities. An entity generally refers to the concept of the entity. For example, the entity "New York City" refers to the physical city, and the knowledge graph uses a concept of the physical city as represented by, for example, an element in a data structure, the name of the entity, any other suitable element, or any combination thereof.

A node representing organizational data may be included in a knowledge graph. These may be referred to herein as entity type nodes. As used herein, an entity type node may refer to a node in a knowledge graph, while an entity type may refer to the concept represented by an entity type node. An entity type may be a defining characteristic of an entity. For example, entity type node Y may be connected to an entity node X by an "Is A" edge or link, discussed further below, such that the graph represents the information "The Entity X Is type Y." For example, the entity node "George Washington" may be connected to the entity type node "President." An entity node may be connected to multiple entity type nodes, for example, "George Washington" may also be connected to entity type node "Person" and to entity type node "Military Commander." In another example, the entity type node "City" may be connected to entity nodes "New York City" and "San Francisco." In another example, the concept "Tall People," although incompletely defined, i.e., it does not necessarily include a definition of "tall," may exist as an entity type node. In some implementations, the presence of the entity type node "Tall People," and other entity type nodes, may be based on user interaction.

In some implementations, an entity type node may include or be connected to data about: a list of properties associated with that entity type node, the domain to which that entity type node belongs, descriptions, values, any other suitable information, or any combination thereof. A domain refers to a collection of related entity types. For example, the domain "Film" may include, for example, the entity types "Actor," "Director," "Filming Location," "Movie," any other suitable entity type, or any combination thereof. In some implementations, entities are associated with types in more than one domain. For example, the entity node "Benjamin Franklin" may be connected with the entity type node "Politician" in the domain "Government" as well as the entity type node "Inventor" in the domain "Business."

In some implementations, properties associated with entity nodes or entity type nodes may also be represented as nodes. For example, nodes representing the property "Population" or "Location" may be connected to the entity type node "City." The combination and/or arrangement of an entity type and its properties is referred to as a schema. In some implementations, schemas are stored in tables or other suitable data structures associated with an entity type node. In some implementations, the knowledge graph may be self-defining or bootstrapping, such that it includes particular nodes and edges that define the concept of nodes, edges, and the graph itself. For example, the knowledge graph may contain an entity node "Knowledge Graph" that is connected to property nodes that describe a knowledge graph's properties such as "Has Nodes" and "Has Edges."

Specific values, in some implementations referred to as literals, may be associated with a particular entity in a terminal node by an edge defining the relationship. Literals may refer to values and/or strings of information. For example, literals may include dates, names, and/or numbers. In an example, the entity node "San Francisco" may be connected to a terminal node containing the literal "815,000" by an edge annotated with the property "Has Population." In some implementations, terminal nodes may contain a reference or link to long text strings and other information stored in one or more documents external to the knowledge graph. In some implementations, literals are stored as nodes in the knowledge graph. In some implementations, literals are stored in the knowledge graph but are not assigned a unique identification reference as described below, and are not capable of being associated with multiple entities. In some implementations, literal type nodes may define a type of literal, for example "Date/Time," "Number," or "GPS Coordinates."

In some implementations, the grouping of an edge and two nodes is referred to as a triple. The triple represents the relationship between the nodes, or in some implementations, between the node and itself. In some implementations, higher order relationships are modeled, such as quaternary and n-ary relationships, where n is an integer greater than 2. In some implementations, information modeling the relationship is stored in a node, which may be referred to as a mediator node. In an example, the information "Person X Donates Artifact Y To Museum Z" is stored in a mediator node connected to entity nodes X, Y, and Z, where each edge identifies the role of each respective connected entity node.

In some implementations, the knowledge graph may include information for differentiation and disambiguation of terms and/or entities. As used herein, differentiation refers to the many-to-one situation where multiple names are associated with a single entity. As used herein, disambiguation refers to the one-to-many situation where the same name is associated with multiple entities. In some implementations, nodes may be assigned a unique identification reference. In some implementations, the unique identification reference may be an alphanumeric string, a name, a number, a binary code, any other suitable identifier, or any combination thereof. The unique identification reference may allow the system to assign unique references to nodes with the same or similar textual identifiers. In some implementations, the unique identifiers and other techniques are used in differentiation, disambiguation, or both.

In some implementations of differentiation, a node may be associated with multiple terms or differentiation aliases in which the terms are associated with the same entity. For example, the terms "George Washington," "Geo. Washington," "President Washington," and "President George Washington" may all be associated with a single entity, i.e., node, in the knowledge graph. This may provide differentiation and simplification in the knowledge graph.

In some implementations of disambiguation, multiple nodes with the same or similar names are defined by their unique identification references, by associated nodes in the knowledge graph, by any other suitable information, or any combination thereof. For example, there may be an entity node related to the city "Philadelphia," an entity node related to the movie "Philadelphia," and an entity node related to the cream cheese brand "Philadelphia." Each of these nodes may have a unique identification reference, stored for example as a number, for disambiguation within the knowledge graph. In some implementations, disambiguation in the knowledge graph is provided by the connections and relationships between multiple nodes. For example, the city "New York" may be disambiguated from the state "New York" because the city is connected to an entity type "City" and the state is connected to an entity type "State." It will be understood that more complex relationships may also define and disambiguate nodes. For example, a node may be defined by associated types, by other entities connected to the node by particular properties, by its name, by any other suitable information, or any combination thereof. These connections may be useful in disambiguating, for example, the node "Georgia" that is connected to the node "United States" may be understood to represent the U.S. State, while the node "Georgia" connected to the nodes "Asia" and "Eastern Europe" may be understood to represent the country in eastern Europe.

In some implementations, a node may include or connect to data defining one or more attributes. The attributes may define a particular characteristic of the node. The particular attributes of a node may depend on what the node represents. In some implementations, an entity node may include or connect to: a unique identification reference, a list of entity types associated with the node, a list of differentiation aliases for the node, data associated with the entity, a textual description of the entity, links to a textual description of the entity, other suitable information, or any combination thereof. As described above, nodes may contain a reference or link to long text strings and other information stored in one or more documents external to the knowledge graph. In some implementations, the storage technique may depend on the particular information. For example, a unique identification reference may be stored within the node, a short information string may be stored in a terminal node as a literal, and a long description of an entity may be stored in an external document linked to by a reference in the knowledge graph.

An edge in a knowledge graph may represent a semantic connection defining a relationship between two nodes. The edge may represent a prepositional statement such as "Is A," "Has A," "Is Of A Type," "Has Property," "Has Value," any other suitable statement, or any combination thereof. For example, the entity node of a particular person may be connected by a "Date Of Birth" edge to a terminal node containing a literal of his or her specific date of birth. In some implementations, the properties defined by edge connections of an entity may relate to nodes connected to the type of that entity. For example, the entity type node "Movie" may be connected to entity nodes "Actor" and "Director," and a particular movie may be connected by an edge property "Has Actor" to an entity node representing a particular actor.

In some implementations, nodes and edges define the relationship between an entity type node and its properties, thus defining a schema. For example, an edge may connect an entity type node to a node associated with a property, which may be referred to as a property node. Entities of the type may be connected to nodes defining particular values of those properties. For example, the entity type node "Person" may be connected to property node "Date of Birth" and a node "Height." Further, the node "Date of Birth" may be connected to the literal type node "Date/Time," indicating that literals associated with "Date of Birth" include date/time information. The entity node "George Washington," which is connected to entity type node "Person" by an "Is A" edge, may also be connected to a literal "Feb. 22, 1732" by the edge "Has Date Of Birth." In some implementations, the entity node "George Washington" is connected to a "Date Of Birth" property node. It will be understood that in some implementations, both schema and data are modeled and stored in a knowledge graph using the same technique. In this way, both schema and data can be accessed by the same search techniques. In some implementations, schemas are stored in a separate table, graph, list, other data structure, or any combination thereof. It will also be understood that properties may be modeled by nodes, edges, literals, any other suitable data, or any combination thereof.

For example, the entity node "George Washington" may be connected by an "Is A" edge to the entity type node representing "Person," thus indicating an entity type of the entity, and may also be connected to a literal "Feb. 22, 1732" by the edge "Has Date Of Birth," thus defining a property of the entity. In this way, the knowledge graph defines both entity types and properties associated with a particular entity by connecting to other nodes. In some implementations, "Feb. 22, 1732" may be a node, such that it is connected to other events occurring on that date. In some implementations, the date may be further connected to a year node, a month node, and a day node. It will be understood that this information may be stored in any suitable combination of literals, nodes, terminal nodes, interconnected entities, any other suitable arrangement, or any combination thereof.

Figure 2:
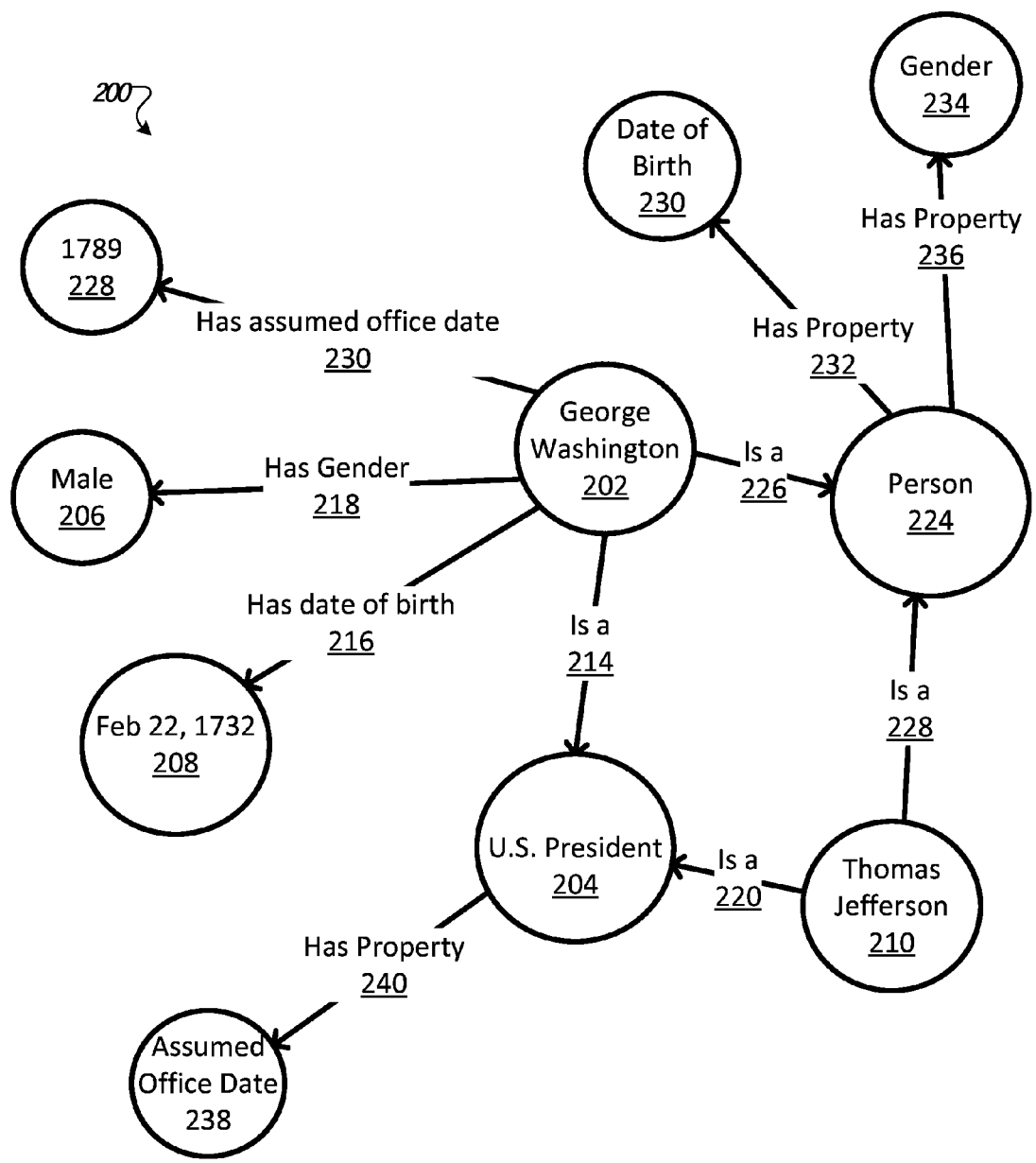
FIG. 2 illustrates an example knowledge graph portion.

FIG. 2 illustrates an example knowledge graph portion 200. Knowledge graph portion 200 includes information related to the entity "George Washington," represented by "George Washington" node 202. "George Washington" node 202 is connected to "U.S. President" entity type node 204 by "Is A" edge 214 with the semantic content "Is A," such that the 3-tuple defined by nodes 202 and 204 and the edge 214 contains the information "George Washington is a U.S. President." Similarly, the information "Thomas Jefferson Is A U.S. President" is represented by the tuple of "Thomas Jefferson" node 210, "Is A" edge 220, and "U.S. President" node 204. Knowledge graph portion 200 includes entity type nodes "Person" 224, and "U.S. President" node 204. The person type is defined in part by the connections from "Person" node 224. For example, the type "Person" is defined as having the property "Date Of Birth" by node 230 and edge 232, and is defined as having the property "Gender" by node 234 and edge 236. These relationships define in part a schema associated with the entity type "Person."

"George Washington" node 202 is shown in knowledge graph portion 200 to be of the entity types "Person" and "U.S. President," and thus is connected to nodes containing values associated with those types. For example, "George Washington" node 202 is connected by "Has Gender" edge 218 to "Male" node 206, thus indicating that "George Washington has gender "Male." Further, "Male" node 206 may be connected to the "Gender" node 234 indicating that "Male Is A Type Of Gender." Similarly, "George Washington" node 202 is be connected by "Has Date of Birth" edge 216 to "Feb. 22, 1732" node 208, thus indicating that "George Washington Has Date Of Birth Feb. 22, 1732." "George Washington" node 202 may also be connected to "1789" node 228 by "Has Assumed Office Date" edge 230.

Knowledge graph portion 200 also includes "Thomas Jefferson" node 210, connected by "Is A" edge 220 to entity type "U.S. President" node 204 and by "Is A" edge 228 to "Person" entity type node 224. Thus, knowledge graph portion 200 indicates that "Thomas Jefferson" has the entity types "U.S. President" and "Person." In some implementations, "Thomas Jefferson" node 210 is connected to nodes not shown in FIG. 2 referencing his date of birth, gender, and assumed office date.

It will be understood that knowledge graph portion 200 is merely an example and that it may include nodes and edges not shown. For example, "U.S. President" node 204 may be connected to all of the U.S. Presidents. "U.S. President" node 204 may also be connected to properties related to the entity type such as a duration of term, for example "4 Years," a term limit, for example "2 Terms," a location of office, for example "Washington D.C.," any other suitable data, or any combination thereof. For example, "U.S. President" node 204 is connected to "Assumed Office Date" node 238 by "Has Property" edge 240, defining in part a schema for the type "U.S. President." Similarly, "Thomas Jefferson" node 210 may be connected to any suitable number of nodes containing further information related to his illustrated entity type nodes "U.S. President," and "Person," and to other entity type nodes not shown such as "Inventor," "Vice President," and "Author." In a further example, "Person" node 224 may be connected to all entities in the knowledge graph with the type "Person." In a further example, "1789" node 228 may be connected to all events in the knowledge graph with the property of year "1789." "1789" node 228 is unique to the year 1789, and disambiguated from, for example, a book entitled "1789," not shown in FIG. 2, by its unique identification reference. In some implementations, "1789" node 228 is connected to the entity type node "Year."

Figure 3:
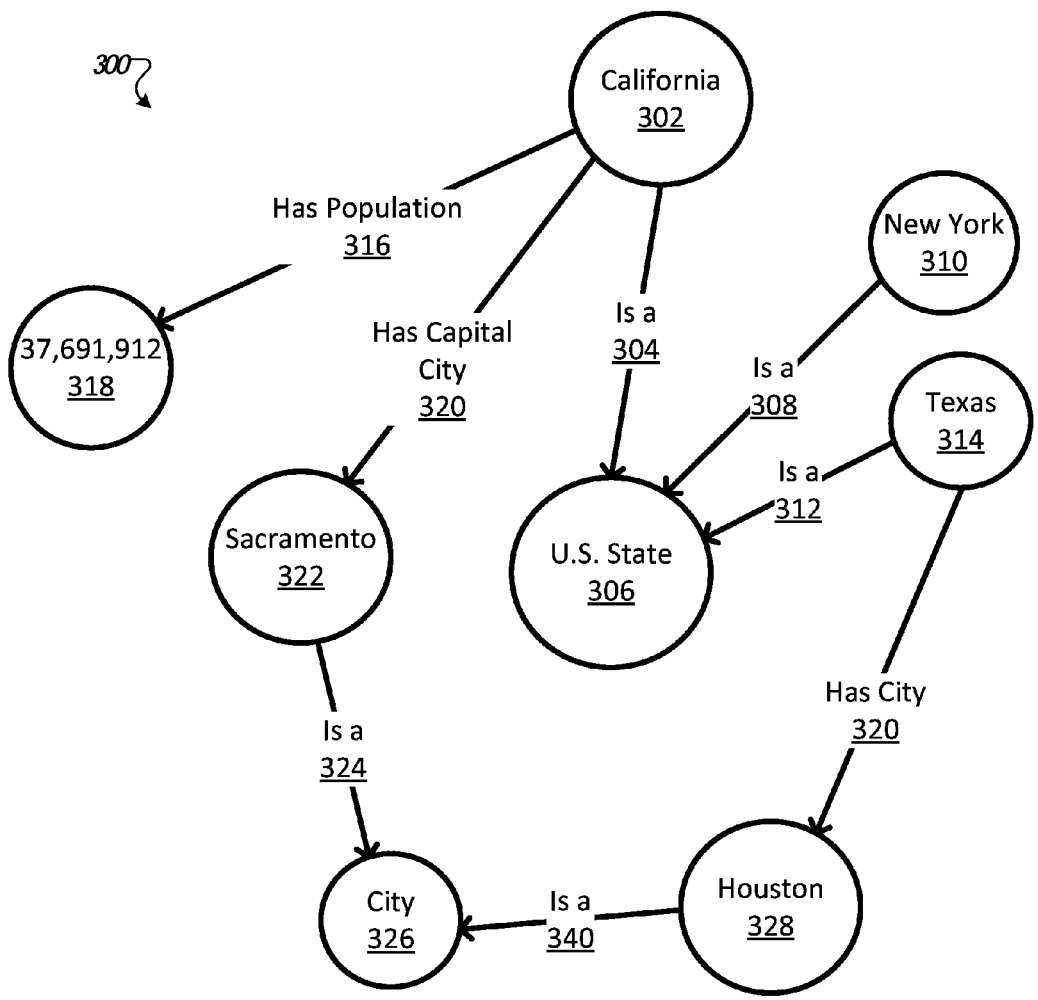
FIG. 3 illustrates another example knowledge graph portion.

FIG. 3 illustrates another example knowledge graph portion 300. Knowledge graph portion 300 includes "California" node 302, which may also be associated with differentiation aliases such as, for example, "CA," "Calif," "Golden State," any other suitable differentiation aliases, or any combination thereof. In some implementations, these differentiations are stored in "California" node 302. California is connected by "Is A" edge 304 to the "U.S. State" entity type node 306. "New York" node 310 and "Texas" node 314 are also connected to "U.S. State" node 306 by "Is A" edges 308 and 312, respectively. "California" node 302 is connected by "Has Capital City" edge 320 to "Sacramento" node 322, indicating the information that "California Has Capital City Sacramento." Sacramento node 322 is further connected by "Is A" edge 324 to the "City" entity type node 326. Similarly, "Texas" node 314 is connected by "Has City" edge 320 to "Houston" node 328, which is further connected to the "City" entity type node 326 by "Is A" edge 340. "California" node 302 is connected by "Has Population" edge 316 to node 318 containing the literal value "37,691,912." In an example, the particular value "37,691,912" may be periodically automatically updated by the knowledge graph based on an external website or other source of data. Knowledge graph portion 300 may include other nodes not shown. For example, "U.S. State" entity type node 306 may be connected to nodes defining properties of that type such as "Population" and "Capital City." These type—property relationships may be used to define other relationships in knowledge graph portion 300 such as "Has Copulation"

edge 316 connecting entity node "California" 316 with terminal node 318 containing the literal defining the population of California.

Figure 4:
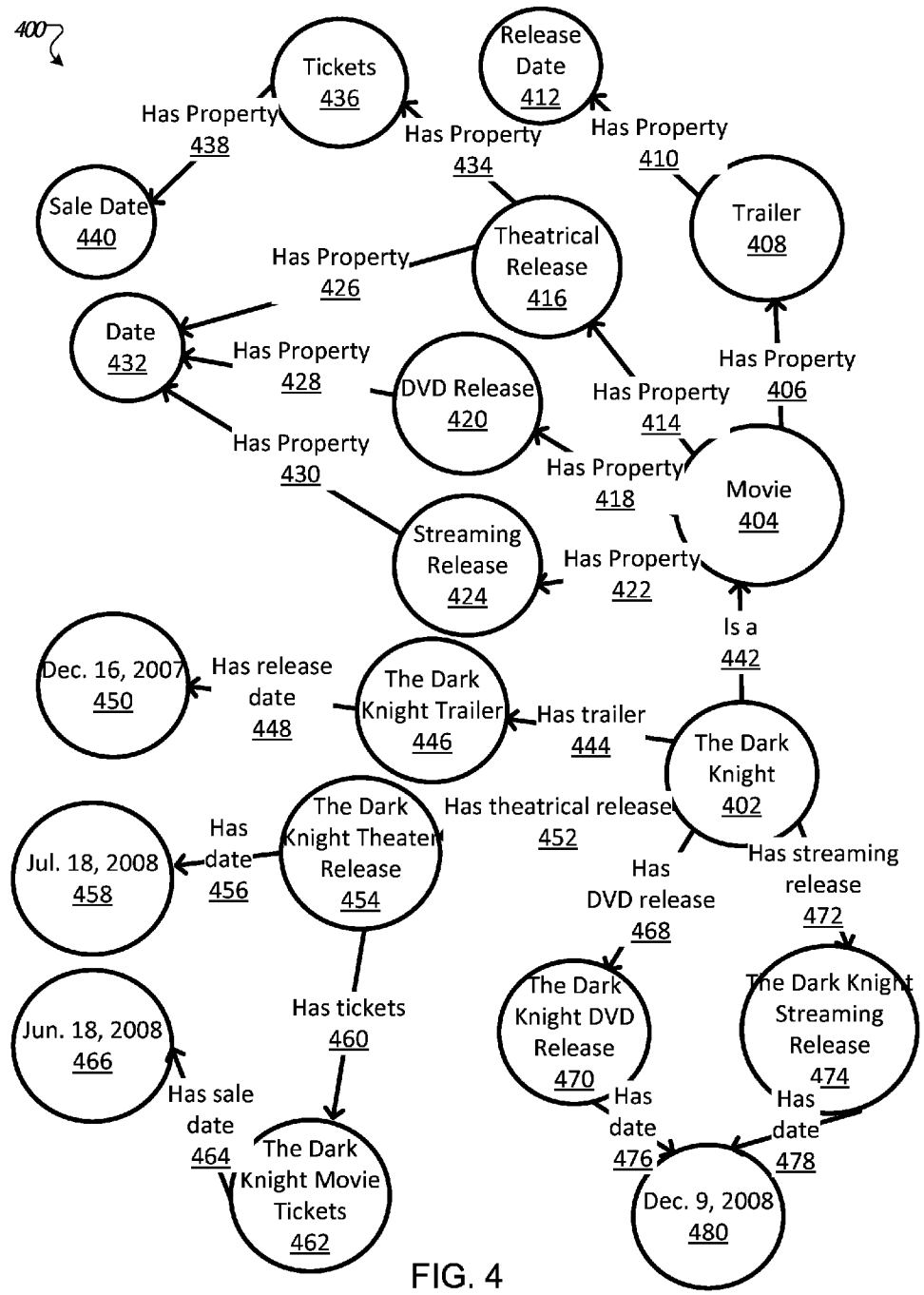
FIG. 4 illustrates another example knowledge graph portion.

FIG. 4 illustrates another example knowledge graph portion 400. Knowledge graph portion 400 includes information related to the movie entity "The Dark Knight," represented by "The Dark Knight" node 402. "The Dark Knight" is connected by "Is a" edge 442 to the "Movie" entity type node 404.

The entity type "Movie" is defined in part by the connections from "Movie" node 404. For example, the type "Movie" is defined as having the properties "Trailer" by node 408 and edge 406, "Theatrical Release" by node 416 and edge 414, "DVD Release" by node 420 and edge 418, and "Streaming Release" by node 424 and edge 422. These relationships define in part a schema associated with the entity type "Movie." Additionally, the property "Trailer" is defined as having the property "Release date" by node 412 and edge 410. The properties "Theatrical Release," "DVD Release," and "Streaming Release" are defined as having the property "Date" by node 432 and edges 426, 428, and 430, respectively. The property "Theatrical Release" is additionally defined as having the property "Tickets" by node 436 and edge 434. The property "Tickets" is defined as having the property "Sale Date" by node 440 and edge 438. These relationships define in part a schema associated with the entity type "Movie."

"The Dark Knight" node 402 is shown in knowledge graph portion 400 to be of the entity type "Movie," and thus is connected to nodes containing values associated with the entity type. For example, "The Dark Knight" node 402 is connected by "Has trailer" edge 444 to "The Dark Knight Trailer" node 446. This indicates, "The Dark Knight movie entity has a The Dark Knight trailer." Furthermore, "The Dark Knight Trailer" node 446 is connected by "Has release date" edge 448 to "Dec. 16, 2007" node 450. This indicates, "The Dark Knight trailer has a release date of Dec. 16, 2007." Combining nodes 402, 446, and 450 and edges 444 and 448 indicates, "The Dark Knight movie entity has a trailer that has a release date of Dec. 16, 2007."

"The Dark Knight" node 402 is also connected by "Has theatrical release" edge 452 to "The Dark Knight Theater Release" node 454. This indicates, "The Dark Knight movie entity has a The Dark Knight theater release." Furthermore, the "The Dark Knight Theater Release" node 454 is connected by "Has date" edge 456 to "Jul. 18, 2008" node 458. This indicates, "The Dark Knight theatrical release has a date of Jul. 18, 2008." Combining nodes 402, 454, and 458 and edges 452 and 456 indicates, "The Dark Knight movie entity has a theater release that has a release date of Jul. 18, 2008."

Furthermore, "The Dark Knight Theater Release" node 454 is connected by "Has tickets" edge 460 to "The Dark Knight Movie Tickets" node 462. This indicates, "The Dark Knight theatrical release has movie tickets." Additionally, "The Dark Knight Movie Tickets" node 462 is connected by "Has sale date" edge 464 to "Jun. 18, 2008" node 466. Combining nodes 402, 454, 462, and 466 and edges 452, 460, and 464 indicates, "The Dark Knight movie entity has a theater release that has tickets that go on sale Jun. 18, 2008."

"The Dark Knight" node 402 is also connected by "Has DVD release" edge 468 to "The Dark Knight DVD Release" node 470. "The Dark Knight" node 402 is also connected by "Has streaming release" edge 472 to "The Dark Knight Streaming Release" node 474. Both the "The Dark Knight DVD Release" node 470 and "The Dark Knight Streaming Release" node 474 are connected by "Has date" edges 476 and 478, respectively, to "Dec. 9, 2008" node 480. Combining nodes 402, 470, and 480 and edges 468 and 476 indicates, "The Dark Knight movie entity has a DVD release date of Dec. 9, 2008." Combining nodes 402, 474, and 480 and edges 472 and 478 indicates, "The Dark Knight movie entity has a streaming release date of Dec. 9, 2008." These relationships define in part a schema associated with the entity "The Dark Knight."

It will be understood that knowledge graph portion 400 is merely an example and that it may include nodes and edges not shown. For example, "Movie" node 404 may also be connected to other properties related to the entity type, such as cast members, producers, directors, filming locations, news items related to the movie, e.g., awards or box office performance, and any other suitable data, or any combination thereof. Similarly, "The Dark Knight" node 402 may be connected to any suitable number of nodes containing further information related to its illustrated entity type node "Movie."

Figure 5:
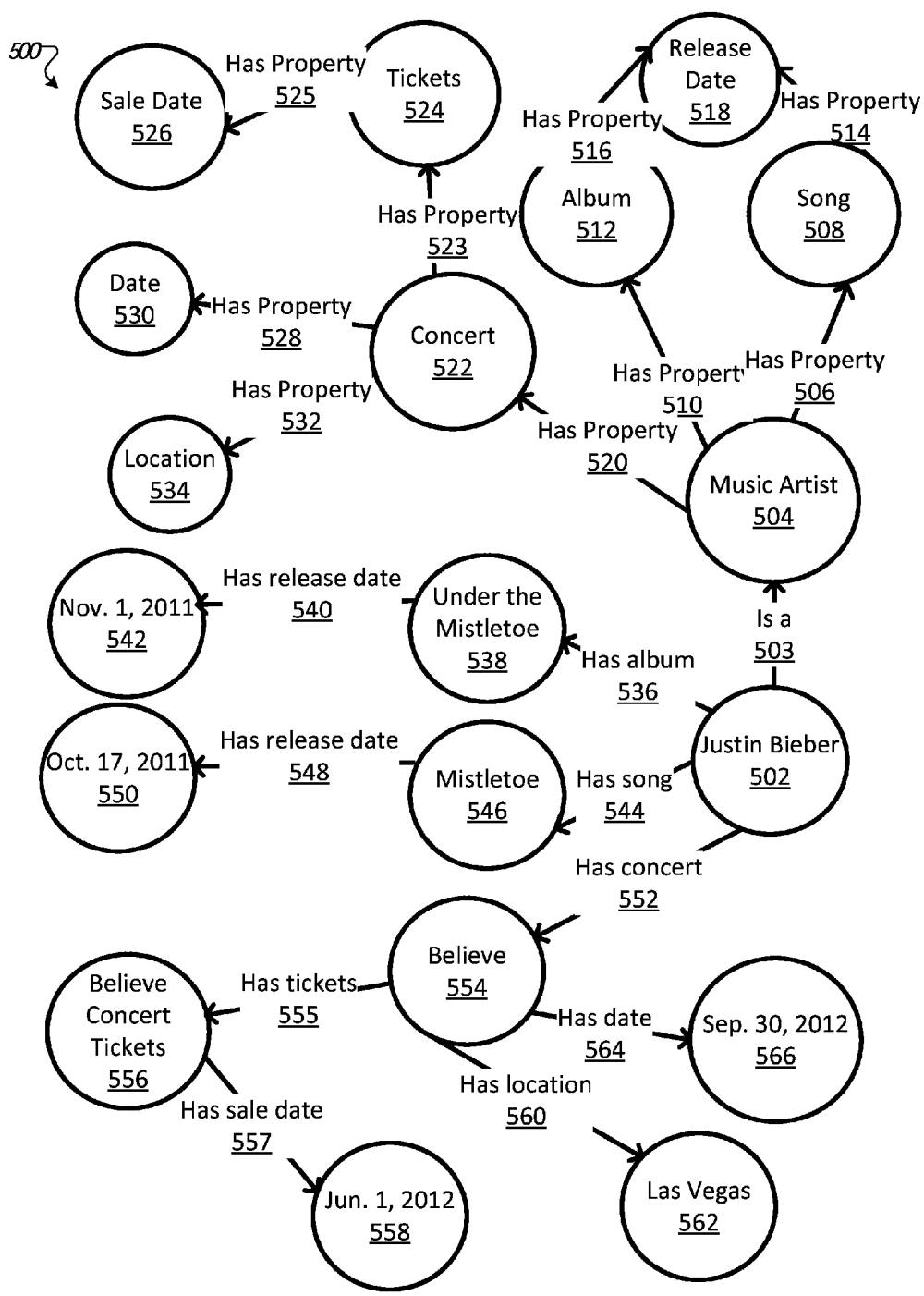
FIG. 5 illustrates another example knowledge graph portion.

FIG. 5 illustrates another example knowledge graph portion 500. Knowledge graph portion 500 includes information related to the musical artist entity "Justin Bieber," represented by "Justin Bieber" node 502. "Justin Bieber" node 502 is connected by "Is a" edge 503 to the "Music Artist" entity type node 504.

The entity type "Music Artist" is defined by the connections from "Music Artist" node 504. For example, the type "Music Artist" is defined as having the properties "Song" by node 508 and edge 506, "Album" by node 512 and edge 510, and "Concert" by node 522 and edge 520. Additionally, the property "Song" and "Album" is defined as having the property "Release Date" by node 518 and edges 514 and 516, respectively. The property "Concert" is defined as having the properties "Tickets" by node 524 and edge 523, "Date" by node 530 and 528, and "Location" by node 534 and edge 532. Additionally, the property "Tickets" is defined as having the property "Sale Date" by node 526 and edge 525.

"Justin Bieber" node 502 is shown in knowledge graph portion 500 to be of the entity type "Music Artist," and thus is connected to nodes containing values associated with the entity type. For example, "Justin Bieber" node 502 is connected by "Has album" edge 536 to "Under the Mistletoe" node 538. Furthermore, "Under the Mistletoe" node 538 is connected by "Has release date" edge 540 to "Nov. 1, 2011" node 542. Combining nodes 502, 538, and 542 and edges 536 and 540 indicates, "The music artist entity Justin Bieber has album Under the Mistletoe which has release date of Nov. 1, 2011."

"Justin Bieber" node 502 is also connected by "Has song" edge 544 to "Mistletoe" node 546. Furthermore, "Mistletoe" node 546 is connected by "Has release date" edge 548 to "Oct. 17, 2011" node 550. Combining nodes 502, 546, and 550 and edges 544 and 548 indicates, "The music artist entity Justin Bieber has song Mistletoe which has release date of Oct. 17, 2011."

"Justin Bieber" node 502 is also connected by "Has concert" edge 552 to "Believe" node 554. Furthermore, "Believe" node 554 is connected by "Has tickets" edge 555 to "Believe Concert Tickets" node 556. "'Believe' Concert Tickets" node 556 is connected by "Has sale date" edge 557 to "Jun. 1, 2012" node 558. Combining nodes 502, 554, 556, and 558 and edges 552, 555, and 557 indicates, "The music artist entity Justin Bieber has Believe concert that has tickets that go on sale Jun. 1, 2012." Furthermore, "Believe" node 554 is connected by "Has date" edge 564 to "Sep. 30, 2012"

node 566. Combining nodes 502, 554 and 566 and edges 552 and 564 indicates, "The music artist entity Justin Bieber has Believe concert that has date of Sep. 30, 2012." Additionally, "Believe" node 554 is connected by "Has location" edge 560 to "Las Vegas" node 562. Combining nodes 502, 554 and 562 and edges 552 and 560 indicates, "The music artist entity Justin Bieber has Believe concert that is located in Las Vegas."

It will be understood that while knowledge graph portion 200 of FIG. 2, knowledge graph portion 300 of FIG. 3, knowledge graph portion 400 of FIG. 4, and knowledge graph portion 500 of FIG. 5 show portions of a knowledge graph, all pieces of information may be contained within a single graph and that these selections illustrated herein are merely an example. In some implementations, separate knowledge graphs are maintained for different respective domains, for different respective entity types, or according to any other suitable delimiting characteristic. In some implementations, separate knowledge graphs are maintained according to size constraints. In some implementations, a single knowledge graph is maintained for all entities and entity types.

A knowledge graph may be implemented using any suitable software constructs. In an example, a knowledge graph is implemented using object oriented constructs in which each node is an object with associated functions and variables. Edges, in this context, may be objects having associated functions and variables. In some implementations, data contained in a knowledge graph, pointed to by nodes of a knowledge graph, or both, is stored in any suitable one or more data repositories across one or more servers located in one or more geographic locations coupled by any suitable network architecture.

Figure 6:
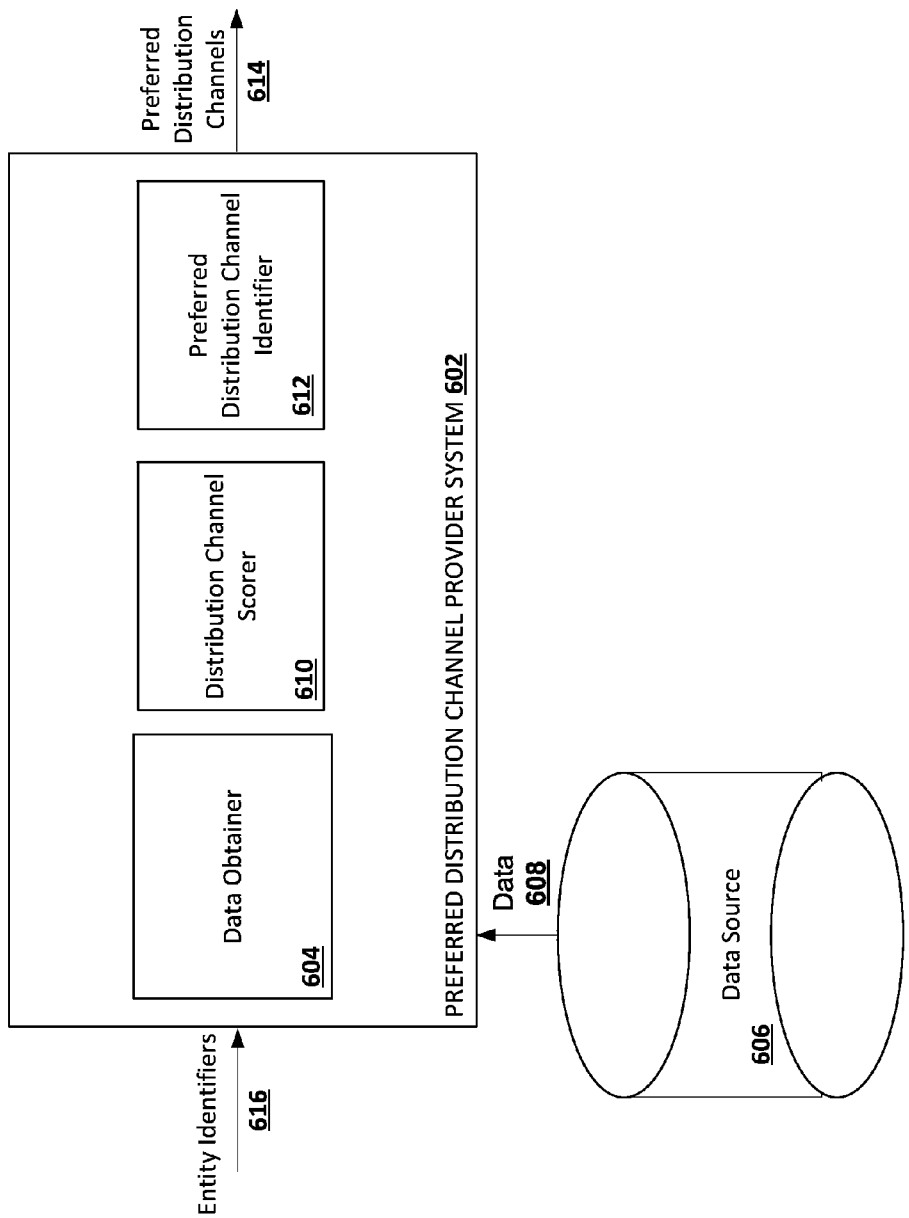
FIG. 6 illustrates an example preferred distribution channel provider system.

FIG. 6 illustrates an example preferred distribution channel provider system 602 as can be implemented for use in an Internet, an intranet, or another client and server environment. The preferred distribution channel provider system 602 can be implemented as, for example, computer programs running on one or more computers in one or more locations that are coupled to each other through a network. The systems, components, and techniques described below can be implemented in the example information provider system.

The preferred distribution channel provider system 602 includes a data obtainer 604, a distribution channel scorer 610, and a preferred distribution channel identifier 612. The preferred distribution channel provider system 602 can communicate with a data source 606 through one or more wired or wireless networks, e.g., mobile phone networks, local area networks (LANs) or wide area networks (WANs), e.g., the Internet. In some implementations, data source 606 can be one or more data sources. For example, the preferred distribution channel provider system 602 can communicate with one or more databases that contain data about one or more users.

In some implementations, the one or more databases contain data that describes the sourcing of different goods or categories of goods by the one or more users. For example, the data source 606 can be one or more databases that contain entries for each of the one or more users. Each entry is associated with a user and describes the sourcing of goods or categories of goods by the user. The sourcing of goods or categories of goods is the act of obtaining the goods or categories of goods from a provider of the goods or categories of goods, e.g., a distribution channel. A good is anything that can satisfy a want or need of the user. A good can be tangible, e.g., a concert ticket, or intangible, e.g., movies or songs in digital medium. A category of goods is any category that can be used to classify goods. For example, "T.V. shows" is a category of goods that can be used to categorize specific T.V. shows, e.g., "Modern Family," and "Friends." In some implementations, a good can be categorized by more than one category of goods. For example, the "The Bicycle Thief," a specific episode of "Modern Family", can be categorized with the following example categories of goods: "video entertainment," "T.V. shows," "Modern Family," and "Modern Family episodes." As a further example, "movies" is a category of goods that can be used to categorize specific movies, for example, "The Dark Knight" and "Gone with the Wind."

The entry describing the sourcing of goods or categories of goods for a particular user can describe specific instances that the particular user sourced a good or category of good. The data describing a specific instance that the user sourced a good can include the specific good that the user sourced, one or more categories of goods that the specific good is categorized as, and the distribution channel that the user used to source the good. A distribution channel is an organization or intermediary that provides goods to users. For example, Moviefone and Fandango are distribution channels for movie tickets while Ticketmaster is a distribution channel for concert and event tickets. As a further example, Netflix and Hulu are distribution channels for movies and T.V. shows. Other data can be stored for each instance that the user sources a good from a distribution channel. For example, the data describing a specific instance of a user sourcing a good can include the time and date that the user sourced the good.

The preferred distribution channel provider system 602 receives entity identifiers 616. The entity identifiers 616 are each associated with a user. The entity identifiers 616 associated with a user identify entities that are of interest to the user. The entities can be of any entity type. Example entity types include movies, actors, music artists, songs, albums, concerts, authors, TV shows, etc. In some implementations, entities can include any entity represented by a node in a knowledge graph portion, e.g., knowledge graph portions 400 and 500 illustrated in FIG. 4 and FIG. 5, respectively. In some implementations, the entities associated with a particular user are derived from concepts that are of interest to the particular user. A concept can be a person, place, thing, or idea. Concepts that are of interest to a particular user are determined from the particular user's online profile. The user's online profile describes activity for the particular user across various web properties. For example, concepts of interest can be determined from the particular user's web search history, social network information, consumed media, location history, check-ins, and other sources.

The concepts of interest are then matched with entities represented in a data source. For example, concepts of interest can be matched with entities represented by data organized in the form of a knowledge graph, as described above. Alternatively, or additionally, concepts of interest can be matched with entities represented in any database containing entity information. In some implementations, concepts of interest to the user are received from a third-party provider. A third-party distribution channel for a particular good can provide the good as a concept of interest for the user based on the user's history of sourcing the good from the third-party distribution channel. For example, a third-party content provider can provide movies as concepts of interest for the user based on the user's movie watching history. The entity identifiers 616 identify the entities that are matched with the user's concepts of interest.

In some implementations, the entity identifiers 616 can identify entities associated with the matched entities for a user. Entities can be associated with other entities. Entity associations are illustrated in knowledge graph portions, for example, knowledge graph portion 400 in FIG. 4 and knowledge graph portion 500 in FIG. 5. The entity identifiers 616 can identify any entity that is associated with a matched entity in the knowledge graph portion containing the schema for the matched entity. For example, if a concept of interest for a user is matched with "The Dark Knight" entity node 402 in FIG. 4, the preferred distribution channel provider system 602 can receive entity identifiers 604 that identify any entity in the schema for the "The Dark Knight" entity in knowledge graph portion 400. For example, the preferred distribution channel provider system 602 can receive "The Dark Knight Streaming Release" as the entity identifier for node 474, or "The Dark Knight Movie Tickets" as the entity identifier for node 462 from knowledge graph portion 400.

The entities identified by the entity identifiers 616 are each associated with a category of goods. For example, "The Dark Knight Movie Tickets" entity can be associated with the category "movie tickets." As a further example, "The Dark Knight Streaming Release" can be associated with the category "streaming movies." In some implementations, an entity identified by an entity identifier can be associated with more than one category of goods. For example, "The Bicycle Thief" episode entity can be associated with the categories "Modern Family," "T.V. shows," and "video entertainment."

The data obtainer 604 obtains data 608 from the data source 606, as described in more detail below with reference to FIG. 7. The data can be obtained from one or more data sources 606 that describe instances of users sourcing goods or categories of goods, as described above. The data 608 describes instances that a user has sourced goods that are associated with the same category or categories of goods as the entities identified by the entity identifiers 616. The data 608 additionally describes the distribution channel that the user used for each instance that the user sourced the goods.

The distribution channel scorer 610 analyzes the data 608 obtained by data obtainer 604. From the obtained data 608, the distribution channel scorer 610 determines a score for a number of candidate distribution channels, as described in more detail below with reference to FIG. 7. The score for a candidate distribution channel is based on the number of times that a user has sourced the category of goods that is associated with the entity identified by the entity identifier from the candidate distribution channel.

The preferred distribution channel identifier 612 identifies one or more preferred distribution channels from the candidate distribution channels. The preferred distribution channels are identified from the candidate distribution channels based on the respective scores determined by the distribution channel scorer 610. The preferred distribution channel provider system 602 provides the preferred distribution channels, as described below with reference to FIG. 7. The preferred distribution channels can be provided to a user. The user can source the entity identified by the entity identifier 616 from the provided distribution channels.

Figure 7:
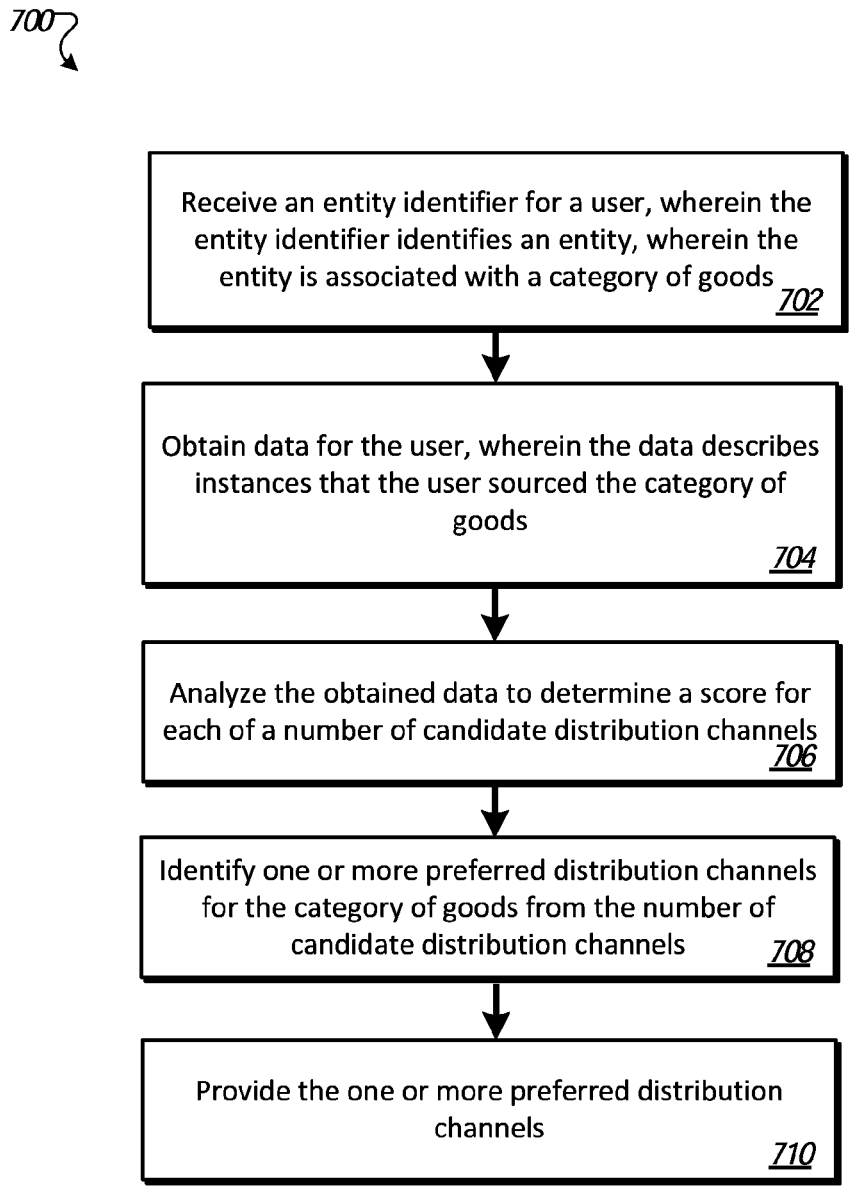
FIG. 7 illustrates an example method for providing preferred distribution channels.

FIG. 7 illustrates an example method for providing preferred distribution channels. For convenience, the example method 700 will be described in reference to a system that performs method 700. The system can be, for example, the preferred distribution channel provider system 602 described above with reference to FIG. 6. In some implementations, the system can be one or more computers.

The system receives an entity identifier for a user (702). The entity identifier identifies an entity that is of interest to the user. In some implementations, the entity of interest to the user can be identified from data organized in the form of a knowledge graph in one or more data sources, as described above with reference to FIG. 6. The entity is associated with a category of goods. In some implementations, the entity is associated with more than one category of goods.

The system obtains data for the user (704). The data describes instances that the user sourced the category or categories of goods associated with the entity identified by the received entity identifier. The data can be obtained from one or more databases that contain data that describes the sourcing of different goods by the user, as described above with reference to FIG. 6. For each instance, the data includes information that identifies a distribution channel from which the user sourced the category of goods.

The system analyzes the obtained data to determine a score for each of a number of candidate distribution channels (706). In implementations where the entity is associated with only one category of goods, the system analyzes the obtained data describing the instances that the user sourced the category of goods from the different distribution channels. From the data, the system determines a score for different candidate distribution channels. Candidate distribution channels can include any distribution channel from which the category of goods can be sourced. In some implementations, the system determines a score for a candidate distribution channel from the number of instances that the user sourced the category of goods from the candidate distribution channel. Candidate distribution channels with a greater number of instances that the user sourced the category of goods from the candidate distribution channels are assigned greater scores than candidate distribution channels with fewer instances. For example, if the data describes forty instances of the user streaming movies from Hulu and four instances of the user streaming movies from Netflix, the candidate distribution channel Hulu is assigned a greater score for the sourcing of the "streaming movies" category of goods.

In some implementations, the system determines a score for a candidate distribution channel from the number of instances that the user sourced the category of goods from the candidate distribution channel within a time period. The time period can be any amount of time. The time period can be from the date that the system is determining the score. For example, the system determines a score for a candidate distribution channel from the number of instances that the user has sourced the category of goods from the candidate distribution channel within the last two months. In some implementations, each of the number of instances that the user sourced the category of goods from the candidate distribution channel can be weighted based on when the instances occurred. Greater weight can be given to the more recent instances that the user sourced the category of goods. For example, if the user sourced the category of goods the same number of times from two candidate distribution channels within the last month, the candidate distribution channel from which the user sourced the category of goods more recently is assigned a greater score. In some implementations, the system determines the score for a candidate distribution channel from the change in the number of instances that the user has sourced the category of goods from the candidate distribution channel within a particular time period compared to an earlier time period. For example, candidate distribution channels with greater increases in the number of instances that the user sourced the category of goods from the candidate distribution channels in the last month compared to the previous month are assigned greater scores than candidate distribution channels that experienced lesser increases.

In some implementations, the system determines scores for the candidate distribution channels from one or more features that describe the entity. For example, the system can receive additional information about the entity identified by the entity identifier. The additional information can describe specific features of the entity. The additional information can be obtained from the knowledge graph portion containing the schema for the entity. For example, the additional information for a video entity can describe features of the video entity. Examples of video entity features include the genre, content length, and price of the video entity. The features of the entity are provided to a model that has been generated, for example, by a machine learning system. The machine learning system can be trained, for example, using conventional techniques. The machine learning system can be trained using data describing instances of the user sourcing goods. The data can be obtained from one or more databases that contain data that describes the sourcing of goods by the user, as described above with reference to FIG. 6. For each instance, the data includes information that identifies a distribution channel from which the user sourced the goods and different features that describe the goods. The data for each instance of the user sourcing goods can be transformed into a feature vector. A learning algorithm of the machine learning system analyzes the training data comprising of the feature vectors to generate the model. In response to the input of the entity features, the model generates scores for the candidate distribution channels. The score for a candidate distribution channel indicates a similarity in the features that describe the entity with the features of past goods that the user has sourced from the candidate distribution channel.

The system identifies one or more preferred distribution channels for the category of goods from the number of candidate distribution channels (708). In some implementations, the system identifies a predetermined number, n, of preferred distribution channels from the candidate distribution channels. For example, if n=3, the system identifies the three candidate distribution channels with the greatest determined scores as the preferred distribution channels. In some implementations, the system only identifies candidate distribution channels as preferred distribution channels if the candidate distribution channels have scores that satisfy a threshold. If no candidate distribution channels have scores that satisfy the threshold, the system takes no further action on the received entity identifier.

In implementations where the entity is associated with more than one category of goods, the system analyzes the obtained data describing the instances that the user sourced the categories of goods from the different distribution channels. For each of the categories of goods, the system determines a score for the different candidate distribution channels as described above. For example, if the system receives an entity identifier for the "The Bicycle Thief" episode entity, the system determines scores for candidate distribution channels from the data describing instances that the user sourced goods of the category "Modern Family" from the candidate distribution channels, as well as scores for candidate distribution channels from data describing instances that the user sourced goods of the categories "T.V. shows" and "video entertainment," respectively. In some implementations, the predetermined number of preferred distribution channels can be identified from the candidate distribution channels with the greatest scores regardless of the category of goods on which the scores are based. In other implementations, the predetermined number of preferred distribution channels can be identified from the candidate distribution channels with the greatest scores for a specific category of goods.

In some implementations, the system provides one or more of the candidate distribution channels to the user. The one or more candidate distribution channels can be presented to the user on a display screen on the user's client device in a graphical user interface. The graphical user interface can present a list identifying the different candidate distribution channels. The graphical user interface can also present text that prompts the user to select the user's preferred distribution channel for the category of goods associated with the entity identified by the entity identifier, e.g., "Please select your preferred distribution channel for streaming movies." The system receives a selection of one or more presented candidate distribution channels from the user. The user can use one or more user interface devices, e.g., keyboard, mouse, or touch sensitive display, associated with the client device to interact with the graphical user interface to select the user's one or more preferred distribution channels. In some implementations, the system identifies only those candidate distribution channels selected by the user as preferred distribution channels. In other implementations, the system identifies only those candidate distribution channels selected by the user with scores that satisfy a threshold as preferred distribution channels.

The system provides the one or more preferred distribution channels (710). The one or more preferred distribution channels are provided to the user so that the user can source the entity identified by the entity identifier from the one or more preferred distribution channels. In some implementations, the system provides the user with a link for each of the one or more preferred distribution channels. The links reference their respective preferred distribution channels. In some implementations, the system provides the links to the user by presenting the links in a graphical user interface on a display screen of the user's client device. The graphical user interface includes a notification object. The notification object notifies the user that the entity identified by the entity identifier can be sourced from the preferred distribution channels referenced by the links, as described in more detail below with reference to FIGS. 8A-8D. The notification object includes text describing the entity identifier, text describing that the entity identified by the entity identifier can be sourced, and links to the preferred distribution channels from which the user can source the entity. In some implementations, the links for the preferred distribution channels can be presented in an order, wherein the order is based on the respective scores for the preferred distribution channels. The system can receive an interaction with a presented link at the client device from the user. In response to the received interaction, the system opens a web browser on the user's client device. The system then sends a webpage associated with the preferred distribution channel referenced by the link to the web browser. The user can source the entity identified by the entity identifier from the webpage. In some implementations, in response to the received interaction, the system causes the user's client device to run an application associated with the preferred distribution channel referenced by the link. The user can source the entity identified by the entity identifier from the application.

FIGS. 8A-8D illustrate example graphical user interfaces for providing preferred distribution channels.

Figure 8A:
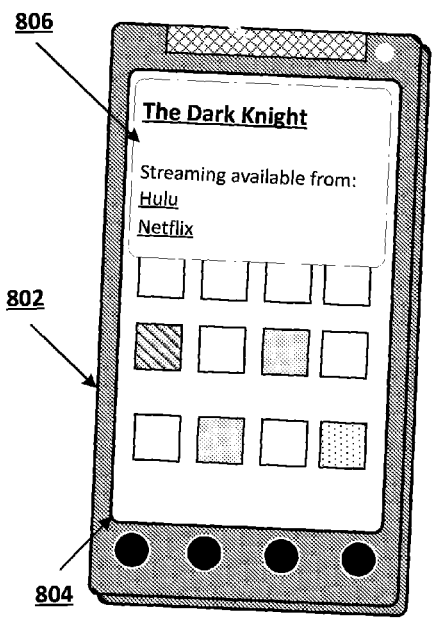
FIGS. 8A, 8B, 8C, and 8D illustrate example graphical user interfaces for providing preferred distribution channels.

In FIG. 8A, the movie The Dark Knight is identified as a concept of interest to a user from the user's online profile. The concept of interest can be matched with the entity "The Dark Knight" represented by "The Dark Knight" entity node 402 in knowledge graph portion 400 illustrated in FIG. 4. An entity of interest to the user can be derived from any entity associated with the "The Dark Knight" entity node 402 in the knowledge graph portion containing the schema for "The Dark Knight." In this example, the entity of interest is the "The Dark Knight Streaming Release" represented by "The Dark Knight Streaming Release" entity node 474. A system, for example the preferred distribution channel provider system 602 described above with reference to FIG. 6, can receive an entity identifier that identifies "The Dark Knight Streaming Release" entity. For example, the system can receive text that identifies "The Dark Knight Streaming Release." The system also receives information describing that "The Dark Knight Streaming Release" is associated with the "streaming movies" category of goods. The system obtains data for the user. The data describes several instances that the user has streamed movies in the past. The data additionally describes a distribution channel for each instance the user sourced a streaming movie. The system determines a score for candidate distribution channels, as described above with reference to FIG. 7. The candidate distribution channels are distribution channels from which the user can source streaming movies. Examples of such distribution channels include Hulu, Netflix, Amazon, Blockbuster, etc. The system determines one or more preferred distribution channels from the candidate distribution channels based on the scores for the candidate distribution channels, as described above with reference to FIG. 7. The system provides the user with information regarding the preferred distribution channels. The system causes a graphical user interface 806 to be presented on a display screen 804 on the user's client device 802. The graphical user interface 806 includes a notification object. The notification object presents information describing the entity of interest to the user, that the entity is available to be sourced, and the preferred distribution channels from which the user can source the entity. For example, the notification object includes text describing the movie entity, e.g., "The Dark Knight," text describing the availability of the movie in streaming format, e.g., "Streaming available from," and the preferred distribution channels from which the user can source the streaming movie. In this example, the preferred distribution channels are Hulu and Netflix. The text identifying Hulu and Netflix is anchor text that links the user directly to the Hulu and Netflix websites, from which the user can stream the movie The Dark Knight.

Figure 8B:
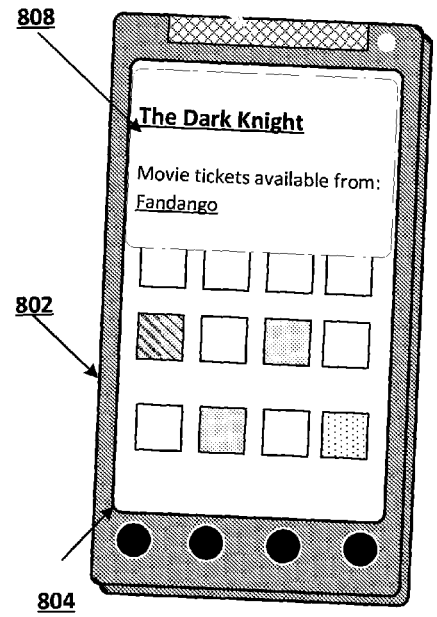

In FIG. 8B, the movie The Dark Knight is identified as a concept of interest to a user from the user's online profile. The concept of interest can be matched with the entity "The Dark Knight" represented by "The Dark Knight" entity node 402 in knowledge graph portion 400 illustrated in FIG. 4. An entity of interest to the user can be derived from any entity associated with the "The Dark Knight" entity node 402 in the knowledge graph portion containing the schema for "The Dark Knight." In this example, the entity of interest is the "The Dark Knight Movie Tickets" represented by "The Dark Knight Movie Tickets" entity node 462. A system, for example the preferred distribution channel provider system 602 described above with reference to FIG. 6, can receive an entity identifier that identifies "The Dark Knight Movie Tickets" entity. For example, the system can receive text that identifies "The Dark Knight Movie Tickets." The system also receives information describing that "The Dark Knight Movie Tickets" is associated with the "movie tickets" category of goods. The system obtains data for the user. The data describes several instances that the user has sourced movie tickets in the past. The data additionally describes a distribution channel for each instance the user sourced movie tickets. The system determines a score for candidate distribution channels, as described above with reference to FIG. 7. The candidate distribution channels are distribution channels from which the user can source movie tickets. Examples of such distribution channels include Fandango, Moviefone, etc. The system determines one or more preferred distribution channels from the candidate distribution channels based on the scores for the candidate distribution channels, as described above with reference to FIG. 7. The system provides the user with information regarding the preferred distribution channels. The system causes a graphical user interface 808 to be presented on a display screen 804 on the user's client device 802. The graphical user interface 808 includes a notification object. The notification object presents information describing the entity of interest to the user, that the entity is available to be sourced, and the preferred distribution channels from which the user can source the entity. For example, the notification object includes text describing the movie entity, e.g., "The Dark Knight," text describing the availability of movie tickets, e.g., "Movie tickets available from," and the preferred distribution channels from which the user can source the movie tickets. In this example, the preferred distribution channel is Fandango. The text identifying Fandango is anchor text that links the user directly to the Fandango website, from which the user can purchase movie tickets for The Dark Knight.

Figure 8C:
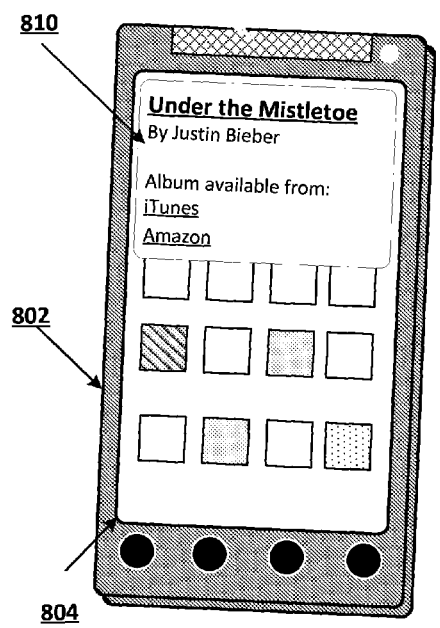

In FIG. 8C, the musical artist Justin Bieber is identified as a concept of interest to a user from the user's online profile. The concept of interest can be matched with the entity "Justin Bieber" represented by "Justin Bieber" entity node 502 in knowledge graph portion 500 illustrated in FIG. 5. An entity of interest to the user can be derived from any entity associated with the "Justin Bieber" entity node 502 in the knowledge graph portion containing the schema for "Justin Bieber." In this example, the entity of interest is the album "Under the Mistletoe" represented by "Under the Mistletoe" entity node 538. A system, for example the preferred distribution channel provider system 602 described above with reference to FIG. 6, can receive an entity identifier that identifies the "Under the Mistletoe" entity. For example, the system can receive text that identifies "Under the Mistletoe." The system also receives information describing that "Under the Mistletoe" is associated with the "music album" category of goods. The system obtains data for the user. The data describes several instances that the user has sourced music albums in the past. The data additionally describes a distribution channel for each instance where the user sourced music albums. The system determines a score for candidate distribution channels, as described above with reference to FIG. 7. The candidate distribution channels are distribution channels from which the user can source music albums. Examples of such distribution channels include iTunes, Amazon, etc. The system determines one or more preferred distribution channels from the candidate distribution channels based on the scores for the candidate distribution channels, as described above with reference to FIG. 7. The system provides the user with information regarding the preferred distribution channels. The system causes a graphical user interface 810 to be presented on a display screen 804 on the user's client device 802. The graphical user interface 810 includes a notification object. The notification object presents information describing the entity of interest to the user, that the entity is available to be sourced, and the preferred distribution channels from which the user can source the entity. For example, the notification object includes text describing the album entity, e.g., "Under the Mistletoe," text describing the availability of the album, e.g., "Album available from," and the preferred distribution channels from which the user can source the album. In this example, the preferred distribution channels are iTunes and Amazon. The text identifying iTunes and Amazon is anchor text that links the user directly to the iTunes and Amazon websites, from which the user can purchase and listen to the album "Under the Mistletoe."

Figure 8D:
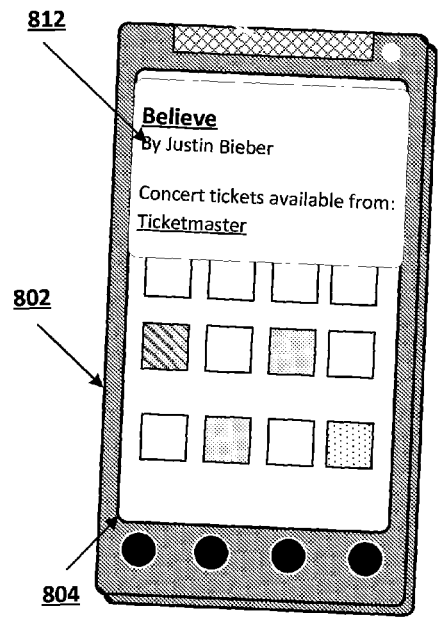

In FIG. 8D, the musical artist Justin Bieber is identified as a concept of interest to a user from the user's online profile. The concept of interest can be matched with the entity "Justin Bieber" represented by "Justin Bieber" entity node 502 in knowledge graph portion 500 illustrated in FIG. 5. An entity of interest to the user can be derived from any entity associated with the "Justin Bieber" entity node 502 in the knowledge graph portion containing the schema for "Justin Bieber." In this example, the entity of interest is the "Believe Concert Tickets" represented by "Believe Concert Tickets" entity node 556. A system, for example the preferred distribution channel provider system 602 described above with reference to FIG. 6, can receive an entity identifier that identifies the "Believe Concert Tickets" entity. For example, the system can receive text that identifies "Believe Concert Tickets." The system also receives information describing that "Believe Concert Tickets" is associated with the "concert tickets" category of goods. The system obtains data for the user. The data describes several instances that the user has sourced concert tickets in the past. The data additionally describes a distribution channel for each instance the user sourced concert tickets. The system determines a score for candidate distribution channels, as described above with reference to FIG. 7. The candidate distribution channels are distribution channels from which the user can source concert tickets. Examples of such distribution channels include Ticketmaster, StubHub, etc. The system determines one or more preferred distribution channels from the candidate distribution channels based on the scores for the candidate distribution channels, as described above with reference to FIG. 7. The system provides the user with information regarding the preferred distribution channels. The system causes a graphical user interface 812 to be presented on a display screen 804 on the user's client device 802. The graphical user interface 812 includes a notification object. The notification object presents information describing the entity of interest to the user, that the entity is available to be sourced, and the preferred distribution channels from which the user can source the entity. For example, the notification object includes text describing the concert entity, e.g., "Believe," text describing the availability of concert tickets, e.g., "Concert tickets available from," and the preferred distribution channels from which the user can source the concert tickets. In this example, the preferred distribution channel is Ticketmaster. The text identifying Ticketmaster is anchor text that links the user directly to the Ticketmaster website, from which the user can purchase concert tickets for "Believe."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of the implementations or on the scope of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

No element, act, or instruction used in the present application should be construed as critical or essential to the disclosed implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

The invention claimed is:

1. A method implemented by one or more processors comprising:
   receiving data generated by one or more client devices as a result of interactions of a user with the one or more client devices;
   determining, based on the data, an entity of interest to the user and entity features for the entity of interest;
   identifying a plurality of candidate channels based on the candidate channels each being a channel from which the entity of interest can be obtained;
   selecting a particular channel from the plurality of candidate channels, wherein selecting the particular channel is based on a number of instances in which the user obtained, from the particular channel, other entities having the entity features, wherein selecting the particular channel based on the number of instances in which the user obtained, from the particular channel, other entities having the entity features comprises:
      weighting more recent in time of the instances greater than less recent in time of the instances;
   generating interactive content that identifies the particular channel and the entity of interest;

providing the interactive content for presentation to the user via a given client device of the user,
the given client device being one of the one or more client devices or an additional client device;
receiving an interaction with the interactive content, the interaction being via a user interface device of the given client device; and
in response to the interaction, performing one or more additional computer-based actions related to obtaining the entity of interest from the particular channel, wherein performing the one or more additional computer-based actions comprises:
causing the given client device to execute an application associated with the particular channel.

2. The method of claim 1, wherein the interactive content includes a link that references the application and wherein the interaction with the interactive content is an interaction with the link.

3. The method of claim 2, wherein the entity features for the entity of interest include a category of the entity of interests.

4. The method of claim 3, wherein the category is a video category, the entity of interest is a video, and wherein the entity features for the entity of interest further include at least one of: a genre of the video, a length of the video, and a price of the video.

5. The method of claim 4, wherein the entity features include each of: the genre of the video, the length of the video, and the price of the video.

6. The method of claim 1, wherein selecting the particular channel from the plurality of candidate channels comprises:
providing the entity features as input to a trained machine learning system;
generating, by the machine learning system based on the input, a score for the particular channel; and
selecting the particular channel based on the score.

7. The method of claim 1, wherein selecting the particular channel based on the number of instances in which the user obtained, from the particular channel, other entities having the entity features comprises:
determining a more recent in time quantity of the instances that occurred during a first time period;
determining a less recent in time quantity of the instances that occurred during a second time period,
the first time period being more recent in time than the second time period;
comparing the more recent in time quantity with the less recent in time quantity; and
selecting the particular channel based on the comparing.

8. The method of claim 1, wherein the entity features for the entity of interest include a first category and a second category of the entity of interest, and wherein selecting the particular channel based on the number of instances in which the user obtained, from the particular channel, other entities having the entity features comprises:
determining a first category quantity of the instances in which the user obtained, from the particular channel, the other entities that have the first category;
determining a second category quantity of the instances in which the user obtained, from the particular channel, the other entities that have the second category; and
selecting the particular channel based on the first category quantity and the second category quantity.

9. A system, comprising:
memory storing instructions;
one or more processors executing the instructions stored in the memory to:
receive data generated by one or more client devices as a result of interactions of a user with the one or more client devices;
determine, based on the data, an entity of interest to the user and entity features for the entity of interest;
identify a plurality of candidate channels based on the candidate channels each being a channel from which the entity of interest can be obtained;
select a particular channel from the plurality of candidate channels, wherein when selecting the particular channel one or more of the processors are to select the particular channel based on a number of instances in which the user obtained, from the particular channel, other entities having the entity features, wherein one or more of the processors, when selecting the particular channel based on the number of instances in which the user obtained, from the particular channel, other entities having the entity features, are to:
weight more recent in time of the instances greater than less recent in time of the instances;
generate interactive content that identifies the particular channel and the entity of interest;
cause a graphical user interface, that includes the interactive content, to be presented on a display screen of a given client device of the user,
the given client device being one of the one or more client devices or an additional client device;
receive an interaction with the interactive content, the interaction being via a user interface device of the given client device; and
in response to the interaction, perform one or more additional computer-based actions related to obtaining the entity of interest from the particular channel, wherein one or more of the processors, when performing the one or more additional computer-based actions, are to: cause the given client device to execute an application associated with the particular channel.

10. The system of claim 9, wherein the interactive content includes a link that references the application and wherein the interaction with the interactive content is an interaction with the link.

11. The system of claim 10, wherein the entity features for the entity of interest include a category of the entity of interest.

12. The system of claim 11, wherein the category is a video category, the entity of interest is a video, and wherein the entity features for the entity of interest further include at least one of: a genre of the video, a length of the video, and a price of the video.

13. The system of claim 9, wherein one or more of the processors, when selecting the particular channel from the plurality of candidate channels, are to:
provide the entity features as input to a trained machine learning system;
generate, based on the input, a score for the particular channel; and
select the particular channel based on the score.

14. The system of claim 9, wherein one or more of the processors, when selecting the particular channel based on the number of instances in which the user obtained, from the particular channel, other entities having the entity features, are to:
determine a more recent in time quantity of the instances that occurred during a first time period;
determine a less recent in time quantity of the instances that occurred during a second time period, the first time period being more recent in time than the second time period;
compare the more recent in time quantity with the less recent in time quantity; and
select the particular channel based on the comparing.

15. The system of claim 9,
wherein the entity features for the entity of interest include a first category and a second category of the entity of interest, and
wherein one or more of the processors, when selecting the particular channel based on the number of instances in which the user obtained, from the particular channel, other entities having the entity feature, are to:
  determine a first category quantity of the instances in which the user obtained, from the particular channel, the other entities that have the first category;
  determine a second category quantity of the instances in which the user obtained, from the particular channel, the other entities that have the second category; and
  select the particular channel based on the first category quantity and the second category quantity.

16. At least one non-transitory computer storage medium storing instructions, the instructions comprising:
a plurality of instructions which, when executed by one or more processors, cause the one or more processors to:
  receive data generated by one or more client devices as a result of interactions of a user with the one or more client devices;
  determine, based on the data, an entity of interest to the user and entity features for the entity of interest;
  identify a plurality of candidate channels based on the candidate channels each being a channel from which the entity of interest can be obtained;
  select a particular channel from the plurality of candidate channels based on a number of instances in which the user obtained, from the particular channel, other entities having the entity features, wherein selecting the particular channel based on the number of instances in which the user obtained, from the particular channel, other entities having the entity features comprises:
    weighting more recent in time of the instances greater than less recent in time of the instances;
  generate interactive content that identifies the particular channel and the entity of interest;
  provide the interactive content for presentation to the user via a given client device of the user,
    the given client device being one of the one or more client devices or an additional client device;
  receive an interaction with the interactive content, the interaction being via a user interface device of the given client device; and
  in response to the interaction, cause the given client device to execute an application associated with the particular channel.

* * * * *